United States Patent Office 3,234,257
Patented Feb. 8, 1966

3,234,257
PROCESS FOR PREPARING COMPOUNDS CONTAINING N-ALKYLATED ETHIONYLAMINO OR VINYLSULFONYLAMINO GROUPS
Rudolf Kühne and Fritz Meininger, Frankfurt am Main, Germany, assignors to Farbwerke Hoechst Aktiengesellschaft vormals Meister Lucius & Brüning, Frankfurt am Main, Germany, a corporation of Germany
No Drawing. Filed July 31, 1962, Ser. No. 213,591
Claims priority, application Germany, Aug. 9, 1961, F 34,643
9 Claims. (Cl. 260—458)

The present invention relates to a process for preparing compounds containing N - alkylated ethionylamino or vinylsulfonylamino groups.

We have found that compounds containing N-alkylated ethionylamino or vinylsulfonylamino groups having the general formula

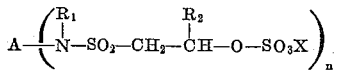

or

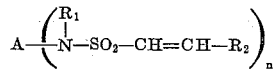

wherein A represents an unsubstituted or substituted aromatic radical, $R_1$ represents an alkyl or aralkyl group, $R_2$ represents an alkyl group or a hydrogen atom, X stands for a hydrogen atom or an alkali metal atom or an alkaline earth metal atom, and $n$ stands for one of the integers 1 to 4, can be prepared by reacting a compound having the formula

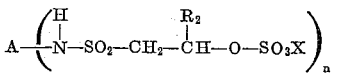

or

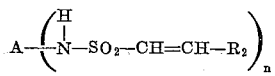

wherein A, $R_2$, X and $n$ are defined as above, with an alkylating agent in an aqueous medium in the presence of an acid-binding agent at a temperature in the range of from about 30° to 130° C.

The alkyl or aralkyl radical $R_1$ contains preferably 1 to 7 carbon atoms and can be, for example, a methyl, ethyl or benzyl radical. As alkyl radicals $R_2$ there are preferably used those which have 1 to 4 carbon atoms, i.e. the methyl, ethyl, propyl, butyl or isobutyl radical.

The radical A in the above formulae can belong, for example, to the benzene, naphthalene, diphenyl, diphenyl ether, diphenyl thioether, diphenylmethane, benzophenone, diphenylamine, diphenylsulfone, azobenzene or to the stilbene series and may contain any substituent such as halogen atoms, alkyl, hydroxy, alkoxy, nitro, sulfonic acid or carboxylic acid groups.

As examples of starting materials containing the above-formulated ethionylamino or vinylsulfonylamino group at least once, the following compounds are mentioned:
1 - N - ethionylamino - benzene, 1,4 - di - (N - ethionylamino) - benzene, 4 - nitro - 1 - N - ethionylamino - benzene, 3 - nitro - 1 - ethionylamino - benzene, halogen - N - ethionylamino - benzenes, such as 3 - chloro - 1 - N - ethionylamino - benzene, 3,4 - dichloro - 1 - N - ethionylamino - benzene, 3,4,6 - trichloro - 1 - N - ethionlyamino - benzene and 4 - bromo - 1 - N - ethionylamino-benzene; furthermore, N-ethionylamino-toluenes and -xylenes, such as 4-methyl-1-N-ethionylamino-benzene or 4 - nitro - 2,5 - dimethyl - 1 - N - ethionylaminobenzene. Furthermore, the corresponding phenols, phenol ethers or nitrophenols, such as 1 - hydroxy - 2 - nitro - 4 - N - ethionylamino - benzene and 4 - ethoxy - 1 - N - ethionylamino - benzene. As suitable starting materials containing an alkyl group (marked $R_2$ in the above-mentioned formula) there may be used, for example, the compounds having the formula

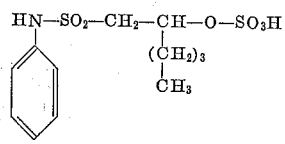

or

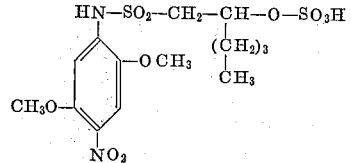

Furthermore, there may be mentioned the N-ethionylamino derivatives of diphenylamine, diphenyl, diphenyl ether, diphenyl thioether, diphenyl sulfone, stilbene, azobenzene, diphenylmethane, benzophenone and naphthalene which may contain any substituent. For the process of the present invention there may, furthermore, be used the corresponding compounds containing instead of the N-ethionylamino groups a vinylsulfonylamino group.

The ethionylamino compounds used as starting materials in the process of the present invention may be prepared by reacting carbylsulfate with a primary aromatic amine in an aqueous medium or in nitrobenzene as medium in the presence of an acid-binding agent.

If the reactions mentioned are carried out with amines containing several primary amino groups in the molecule, such as phenylene diamines and toluylene diamines, compounds can be obtained in which several ethionylamino groups are bound to the aromatic nucleus, the structure of which, therefore, corresponds to the above-mentioned formula for the case $n>1$.

It is, furthermore, possible to introduce into an aromatic monoethyionylamino compound additionally one or several further ethionylamino groups, for example, by reacting nitraniline with carbylsulfate according to the process described above, subsequently reducing the nitro group of the aromatic nitro compounds so obtained and reacting once more the amine obtained with the carbylsulfate.

The vinylsulfonylamino compounds which are likewise useful as starting materials for the process of the present invention can be prepared, for example, by splitting off sulfuric acid or sulfates from the above-mentioned aromatic ethionylamino compounds. By this conversion of the ethionylamino compounds into the vinylsulfonylamino compounds which can be conducted in a relatively simple manner, the two classes of compounds mentioned are closely related to one another.

For carrying out the process the compounds containing the ethionylamino or vinylsulfonylamino groups are dissolved in water or suspended therein in a finely divided form and reacted at a temperature between about 30° and 130° C. in the presence of an acid-binding agent in a neutral or weakly alkaline medium with an alkylating agent while vigorously stirring.

As alkylating agents there are used alkyl halides, such as methyl and ethyl bromide or aralkyl halides, such as benzylchloride, and preferably, alkyl sulfates, such as diethyl sulfate and particularly dimethyl sulfate.

As acid-binding agents there may be used alkali metal or alkaline earth metal hydroxides, borates, phosphates and acetates, and preferably, alkali metal or alkaline earth metal carbonates or hydrogen carbonates, such as potassium hydrogen carbonate, sodium carbonate or calcium carbonate.

By working under the suitable reaction conditions the compounds containing N-alkyl-N-vinylsulfonylamino groups may also be directly prepared from the starting materials containing ethionylamino groups by reacting them with the alkylating agents and simultaneously splitting off sulfuric acid in the form of its salts.

The compounds obtainable by the process of the present invention are intermediary products for the preparation of novel and technically very interesting reactive dyestuffs, pharmaceuticals, textile auxiliaries and herbicides.

For example, the nitro-substituted N-alkylated ethionylamino-benzenes or vinylsulfonylamino-benzenes obtainable by the present invention may be applied to cotton on which they may be fixed and reduced to the corresponding amino derivatives by treating them with sodium hydrosulfite in the presence of an alkaline substance. When the amino compounds are diazotized on the fibre and coupled with coupling components, for example, with pyrazolone derivatives or 2,3-hydroxynaphthoic acid arylides, there are obtained uniform dyeings having very good fastness properties. Furthermore, the polyhalogenated N-alkyl-ethionylamino-benzenes or N-alkyl-vinylsulfonylamino-benzenes, such as 3,4,6-trichloro-1-N-ethionylamino-benzene or -vinyl-sulfonylamino-benzene, may be fixed on wool yielding valuable and fast mothproof finishes. The compounds of the present invention containing a strongly hydrophobic aromatic radical, such as 2-N-methyl-N-ethionylamino-naphthalene may be used as hydrophobizing agent for cellulosic materials.

The following examples serve to illustrate the invention but they are not intended to limit it thereto, the parts being by weight unless otherwise stated and the relationship of parts by weight to parts by volume being the same as that of the kilogram to the liter.

*Example 1*

36.4 parts of the potassium salt of 3-nitro-1-N-ethionylamino-benzene were introduced, while vigorously stirring, into 300 parts by volume of water and methylated at 35° to 40° C. by adding dropwise 49.5 parts by volume of dimethylsulfate. By simultaneously adding solid potassium or sodium bicarbonate the pH-value of the reaction mixture was maintained at 7.2 to 7.4 After this addition stirring was continued for 2 hours at 35° to 40° C. while controlling the pH-value. Subsequently the product which had already partially crystallized out during the reaction was salted out by the addition of potassium chloride and suction-filtered at 10° C. The product so obtained was washed with a potassium chloride solution of 20% strength by weight until neutral and dried at 60° C. The 3-nitro-1-N-methyl-N-ethionylamino-benzene obtained in a very good yield recrystallized from water in the form of flat weakly yellow needles melting at 228° to 229° C. with decomposition.

*Example 2*

31.9 parts of the potassium salt of 1-N-ethionylamino-benzene were dissolved in 320 parts by volume of hot water and 50 parts by volume of dimethylsulfate and 57 parts of solid potassium bicarbonate were added within about 1 hour at 35° to 40° C., while vigorously stirring in such a manner that the pH-value of the mixture was 7 to 7.3. At this pH and at the same temperature the mixture was then stirred for 4 hours. A sample of the reaction mixture to which a 2 N-sodium hydroxide solution had been added, yielded a colorless crystalline precipitate. The product was salted out by the addition of potassium chloride, filtered off, washed with saturated potassium chloride solution and then dried in vacuo at 40° C. After recrystallization from water the potassium salt of 1-N-methyl-N-ethionylamino-benzene was obtained in a very good yield in the form of colorless columnar needles melting at 177° to 178° C. with decomposition.

*Example 3*

Into a stirred suspension of 66.7 parts of the potassium salt of 5-nitro-2,4-dimethoxy-1-N-ethionylamino-benzene in 995 parts by volume of water 131 parts by volume of dimethylsulfate were added dropwise at 35° C. within 1½ hours. By simultaneously adding potassium bicarbonate the pH-value of the mixture was maintained at 7 to 7.2. It was after-stirred for 1 hour at 35° to 40° C. and subsequently 25 parts by volume of dimethylsulfate and potassium bicarbonate were added while maintaining the pH-value mentioned. When the reaction was complete the potassium salt of 5-nitro-2,4-dimethoxy-1-N-methyl-N-ethionylamino-benzene obtained was salted out with potassium chloride, filtered off, washed until neutral with 20 parts of potassium chloride solution of 20% strength by weight and dried. The product obtained in a very good yield recrystallized from water in colorless little rods melting at 193.5° to 194° C. with decomposition.

$C_{11}H_{15}O_{10}N_2S_2K$ calculated: C, 30.1; H, 3.5; N, 6.4. Found: C, 29.9; H, 3.5; N, 6.4.

By using the potassium salt of 4-nitro-2,5-dimethoxy-1-N-ethionylamino-benzene the potassium salt of 4-nitro-2,5-dimethoxy-1-N-methyl-N-ethionylamino-benzene was obtained in the same good yield. The compound melted at 175° to 176° C. with decomposition.

*Example 4*

Into a solution of 31.9 parts of the potassium salt of 1-N-ethionylamino-benzene in 200 parts by volume of water diluted sodium hydroxide solution was introduced at 60° C. until the pH-value of 10 to 11 was maintained. To the alkaline solution of the N-vinylsulfonylamino-benzene obtained 42 parts by volume of dimethylsulfate and 2 N-sodium hydroxide solution were added simultaneously at 40° C. while vigorously stirring in such a manner that the pH-value of 7.5 to 8 was maintained. The addition of dimethylsulfate and sodium hydroxide solution being complete, the mixture was after-stirred for 2 hours at 40° C., neutralized with dilute hydrochloric acid and cooled to 0° C. By this process the separated oily product was transformed into colorless crystals which were isolated by filtration, washed with water and dried at 50° C. After recrystallization from aqueous ethyl alcohol the N-methyl-N-vinylsulfonylamino-benzene was obtained in the form of colorless needles melting at 80° C. By using 2-chloro-5-nitro-1-N-ethionylamino-benzene, the 2-chloro-5-nitro-1-N-methyl-N-vinylsulfonylamino-benzene was obtained in a very good yield. From aqueous acetone colorless crystals melting at 136° to 137° C. were obtained.

$C_9H_9O_4N_2ClS$ calculated: C, 39.1; H, 3.3; N, 10.2; Cl, 12.8. Found: C, 39.0; H, 3.2; N, 10.1; Cl, 12.5.

*Example 5*

15 parts of the sodium salt of 4-N-ethionylamino-diphenyl ether were introduced at a temperature of 50° to 60° C. into 200 parts by volume of water and converted into the 4-N-vinylsulfonylamino-diphenyl ether by the addition of dilute sodium hydroxide solution at a pH-value of 10 to 11. The mixture was cooled to 40° to 45° C. and, simultaneously 25 parts by volume of dimethylsulfate and 2 N-sodium hydroxide solution were introduced in such a manner that a pH-value of 10 to 11 was maintained. The methylation being complete, the precipitated product was filtered off, washed with water and dried in vacuo at 60° C. The 4-N-methyl-N-vinylsulfonylamino-diphenyl ether obtained in a very good yield was obtained after recrystallization from alcohol in the form of colorless needless melting at 85° C.

*Example 6*

41 parts of the potassium salt of 2-methyl-4-nitro-5- methoxy-1-N-ethionylamino-benzene were dissolved at 75° C. while stirring in 475 parts by volume of water. At that temperature and at the pH-value of 7.0 to 7.1, 92 parts by volume of dimethylsulfate and dilute potassium carbonate solution were introduced within 1 hour. The methylation being complete the mixture was worked up in the usual manner and the potassium salt of 2-methyl-4-nitro-5-methoxy-1-N-methyl-N-ethionylamino-benzene obtained was recrystallized from water. Melting point: 212° C. with decomposition.

$C_{11}H_{14}O_5N_2S$ calculated: C, 31.3; H, 3.6; N, 6.6. Found: C, 31.0; H, 3.8; N, 6.6.

When the reaction was carried out at a pH-value of 8 to 9 instead of at a pH-value of 7 to 7.1, the 2-methyl-4-nitro-5-methoxy-1-N-methyl-N-vinylsulfonylamino-benzene was obtained in a very good yield. The compound crystallized from acetone in the form of colorless granular crystals melting at 119° C.

Example 7

9.0 parts of the potassium salt of 2-N-ethionylamino-naphthalene were dissolved in 350 parts by volume of hot water. Subsequently, 25 parts by volume of dimethylsulfate and an aqueous potassium bicarbonate solution were introduced at 35° to 40° C., while vigorously stirring in such a manner that the pH-value of 7.2 to 7.4 was maintained. The reaction being complete the mixture was neutralized with dilute acetic acid and potassium chloride was added. The precipitated product was filtered off, washed with cold water and dried in vacuo at 40° C. The potassium salt of 2-N-methyl-N-ethionylamino-naphthalene obtained in a good yield was obtained after recrystallization from water in the form of colorless crystals melting at 212° to 214° C. with decomposition.

Example 8

25 parts of the sodium salt of 4-N-ethionylamino-benzophenone were dissolved in 120 parts by volume of hot water and dilute sodium hydroxide was added at 50° C. in such a manner that the pH-value of the mixture was maintained at 11.8. Subsequently the mixture was methylated by adding dropwise 50 parts by volume of dimethylsulfate and sodium hydroxide solution of 30% strength by weight at 40° to 45° C. and at a pH-value of 10 to 11. The reaction being complete the mixture was cooled to 9° C. and acidified with dilute hydrochloric acid whereby the product precipitated in an oily form crystallizes. After recrystallization from alcohol the 4-N-methyl-N-vinylsulfonylamino-benzophenone was obtained in the form of colorless needles melting at 93° to 94° C.

Example 9

34 parts of the potassium salt of 4-nitro-2-methoxy-1-N-ethionylamino-benzene were introduced at 80° C. into 300 parts by volume of water and 2 N-sodium hydroxide solution was added until a pH-value of 10 to 11 was maintained. The solution was cooled to 60° C. and 49 parts by volume of diethylsulfate were introduced within 1½ hours while vigorously stirring. By simultaneously introducing 2 N-sodium hydroxide solution the pH-value of 8 to 9 was maintained. The mixture was subsequently after-stirred for 2 hours at 60° C., then cooled to 10° C. and acidified with dilute acetic acid. The crystalline precipitate was filtered off and stirred twice at 20° C. with dilute sodium hydroxide solution. The product was again filtered off and washed with water. After recrystallization from alcohol weakly yellowish crystals of 4-nitro-2-methoxy-1-N-ethyl-N-vinylsulfonylamino-benzene were obtained which melted at 83° to 84° C.

Example 10

25 parts of the potassium salt of 2,5-dimethyl-4-nitro-1-N-ethionylamino-benzene were dissolved at 60° C. in 980 parts by volume of water. Into the solution cooled to 35° C. 30 parts by volume of dimethylsulfate were added dropwise while vigorously stirring. By simultaneously adding potassium bicarbonate the pH-value was maintained at 7 to 7.3. The reaction being complete the product was salted out with potassium chloride, the precipitate was suction-filtered and washed with potassium chloride solution. By repeatedly recrystallizing from water the potassium salt of 2,5-dimethyl-4-nitro-1-N-methyl-N-ethionylamino-benzene was obtained in the form of weakly yellowish crystals melting at 237° C. with decomposition.

Example 11

30.5 parts of 3-nitro-4-ethoxy-1-N-ethionylamino-benzene were dissolved in 510 parts by volume of hot water. For the methylation 60 parts by volume of dimethylsulfate and dilute potassium bicarbonate solution were simultaneously added at 40° C., while vigorously stirring, in such a manner that the pH-value of the mixture was 7.3 to 7.5. The mixture was subsequently after-stirred for 1 hour at 40° C., cooled to 10° C. and potassium chloride was added. The precipitated product was isolated by filtration, washed with potassium acetate solution and finally recrystallized from water. The potassium salt of 3-nitro-4-ethoxy-1-N-methyl-N-ethionylamino-benzene was obtained in the form of weakly yellow crystals melting at 143° to 145° C. with decomposition.

Example 12

31 parts of the potassium salt of 1-N-ethionylamino-benzene were dissolved at 80° to 90° C. in 150 parts by volume of water and 2 N-sodium hydroxide solution was added until the pH-value of 9 was maintained. Subsequently 20 parts by volume of benzylchloride and simultaneously 2 N-sodium hydroxide solution were introduced into the well stirred solution in such a manner that the reaction could be effected at a pH-value of 8 to 9. The mixture was after-stirred for 2 hours at 95° C. while controlling the pH-value until the odor of benzylchloride had dissipated. After cooling the precipitated product was separated by filtration and recrystallized from alcohol. The N-benzyl-N-vinylsulfonylamino-benzene was obtained in the form of needles united to bundles melting at 112° C.

We claim:

1. A process for preparing a compound having the formula

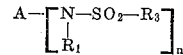

wherein A is a member selected from the group consisting of benzene, naphthalene, diphenyl, diphenyl ether, diphenyl thioether, diphenylmethane, benzophenone, diphenylamine, diphenylsulfone, azobenzene, stilbene, and chloro-, bromo-, lower alkyl-, hydroxy-, lower alkoxy- and nitro-substituted benzene, $R_1$ is a member selected from the group consisting of alkyl of 1 to 7 carbon atoms and benzyl, $n$ is an integer from 1 to 4, and $R_3$ is a member selected from the group consisting of

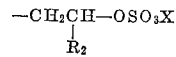

and

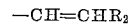

wherein $R_2$ is a member selected from the group consisting of hydrogen and alkyl of 1 to 4 carbon atoms and X is a member selected from the group consisting of hydrogen, sodium and potassium atoms, which comprises reacting a compound having the formula

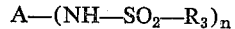

wherein A, $R_3$ and $n$ are as defined above, with an alkylating agent selected from the group consisting of alkyl and benzyl chlorides, bromides and sulfates, the alkyl groups therein being of 1 to 7 carbon atoms, in an aqueous medium in the presence of an acid-binding agent at a temperature in the range of from about 30° to about 130° C.

2. A process as defined in claim 1 wherein the alkylating agent is dimethylsulfate.

3. A process as defined in claim 1 wherein the alkylating agent is diethylsulfate.

4. A process as defined in claim 1 wherein the alkylating agent is benzyl chloride.

5. A process as defined in claim 1 wherein the acid-binding agent is potassium bicarbonate.

6. A process as defined in claim 1 wherein the acid-binding agent is sodium hydroxide.

7. A process for preparing 1-N-methyl-N-ethionylamino-benzene which comprises reacting the potassium salt of 1-N-ethionylamino-benzene with dimethylsulfate in an aqueous medium in the presence of potassium bicarbonate at a temperature in the range of from about 30° to about 40° C.

8. A process for preparing 3-nitro-4-ethoxy-1-N-methyl-N-ethionylamino-benzene which comprises reacting 3-nitro-4-ethoxy-1-N-ethionylamino-benzene with dimethylsulfate in an aqueous medium in the presence of potassium bicarbonate at a temperature in the range of from about 30° to about 40° C.

9. A process for preparing 4-nitro-2-methoxy-1-N-ethyl-N-vinylsulfonylamino-benzene which comprises reacting the potassium salt of 4-nitro-2-methoxy-1-N-vinylsulfonylamino-benzene with diethylsulfate in an aqueous medium in the presence of sodium hydroxide at a temperature in the range of about 60° C.

References Cited by the Examiner

UNITED STATES PATENTS

| | | | |
|---|---|---|---|
| 2,349,749 | 5/1944 | Paul | 260—556 |
| 2,358,465 | 9/1944 | McNally et al. | 260—556 |
| 2,390,113 | 12/1945 | McNally et al. | 260—556 XR |
| 2,666,788 | 1/1954 | Ebel | 260—458 |
| 3,124,610 | 3/1964 | Larsen | 260—556 XR |
| 3,133,086 | 5/1964 | Bosshard et al. | 260—556 XR |

CHARLES B. PARKER, *Primary Examiner.*

JOSEPH P. BRUST, *Examiner.*